Patented Apr. 8, 1952

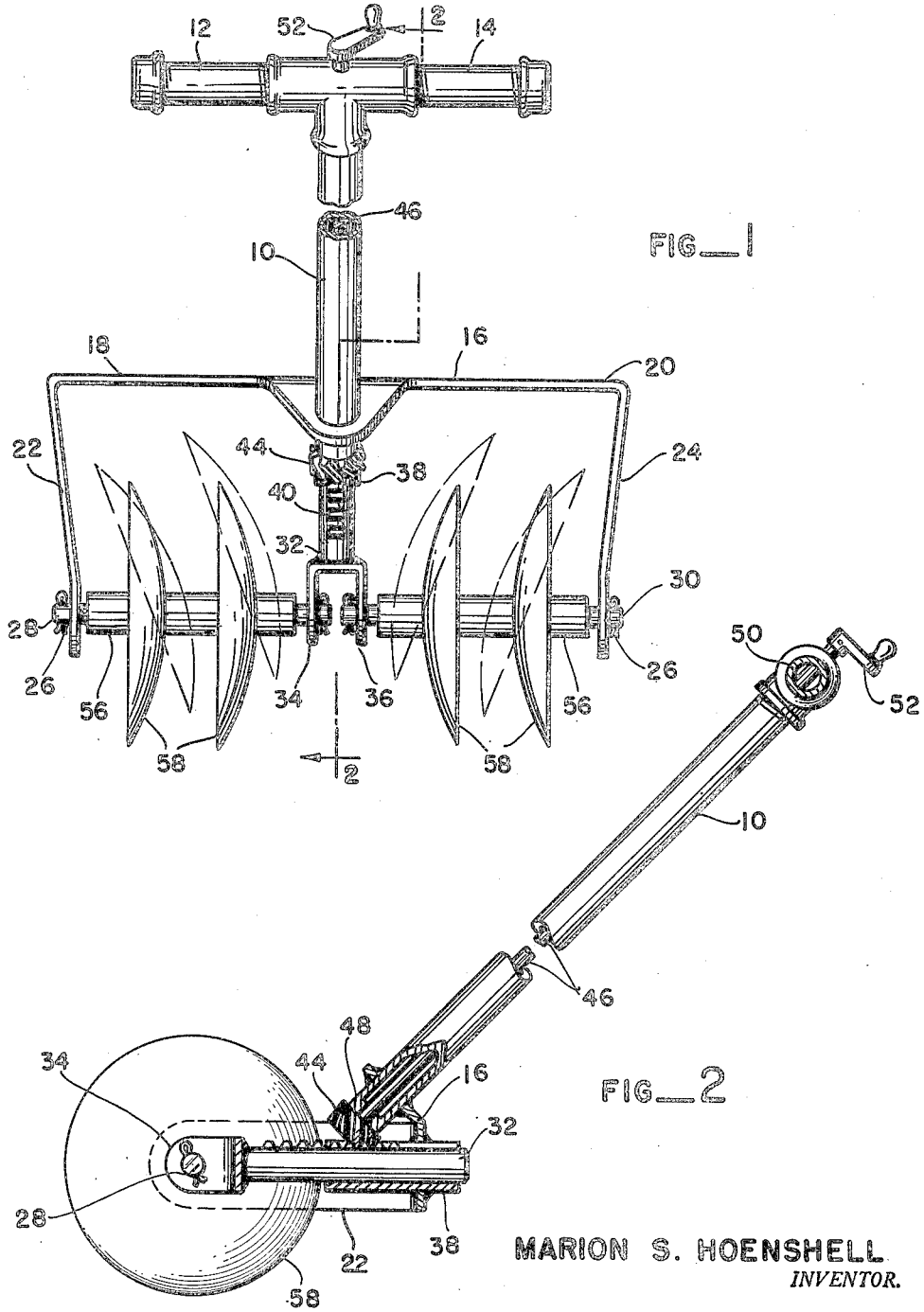

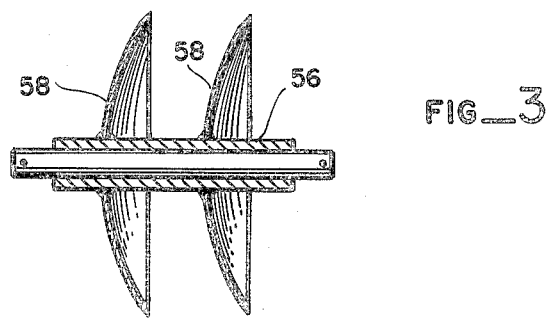
FIG_3
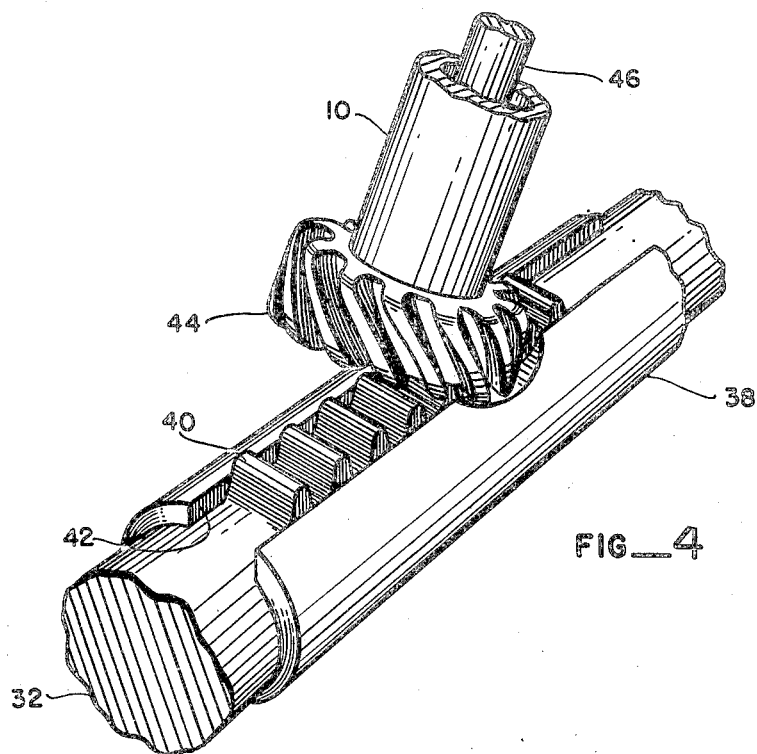
FIG_4
MARION S. HOENSHELL
*INVENTOR.*
BY *Smith & Tuck*
*ATTORNEYS*

2,592,423

UNITED STATES PATENT OFFICE 2,592,423

ADJUSTABLE DISK GARDEN CULTIVATOR

Marion S. Hoenshell, Seattle, Wash.

Application July 1, 1947, Serial No. 758,388

4 Claims. (Cl. 97—58)

1

My present invention relates to the general class of garden cultivators and, more specifically, to an adjustable disc garden cultivator.

There are, throughout our country, a great many households that have their own gardens and, because of the relatively small size of these gardens, the various tools and implements that they use must be capable of hand operation.

It has been found that the usual hand tools, such as the spading fork or the spade or the hoe, are relatively primitive in their application to present day needs and there has been increasing demand for equipment in the way of garden implements that can be hand-operated by a single individual, which will go part way, at least, into the field of tilling soil using the methods that farmers have found to be so practical.

My present invention is of this type of implement. It consists essentially of a plurality of discs which can be used to cultivate the surface of the ground or may, by proper pitching of the discs, cut to considerable depth and provide an even cultivation of the seed beds. At other periods of the year it may be desirable to cultivate only the surface, to get rid of surface growth, such as weeds and the like, or to so finely pulverize the soil as to provide a surface mulch for the protection of the growing crops.

In the past many attempts have been made to give the hand farmer a disc implement that will operate manually, but those observed have either entirely overlooked the necessary adjustment of a plurality of discs if they are going to operate as a farmer's larger implement operates, or if they are capable of suitable adjustment, that adjustment requires a stoppage of the work and a careful adjustment of the device, usually by means of a wrench, and then even when this adjustment is effected, it may be desired only for a relatively small area, and then a different adjustment is desired.

My present invention supplies this need for a manually operated disc cultivator that can be adjusted or pitched from time to time as desired while the device is in use, and the pitch can be so easily changed that it can be effected as frequently as necessary to accurately suit the operation of the implement to the conditions at hand.

The principal object of my invention, therefore, is to provide a manually operated disc cultivator, in which the pitching of the discs can be achieved without the need of a wrench, and further without the necessity of stopping the cultivating operation.

A further object of my invention is to provide a

2 pitching of two substantially aligned disc-bearing shafts so that each of a plurality of discs will have the same adjustment and will all lie in the same horizontal plane, so that accurate and uniform work can be achieved with the implement.

A further object of my invention is to provide an easily effected adjustment which is so arranged that, once the adjustment is made, it is held in that degree of adjustment until the operator chooses to change it again.

Further objects, advantages and capabilities will be apparent from the description and disclosure in the drawings, or may be comprehended or are inherent in the device.

In the drawings:

Fig. 1 is a top plan view of my implement in the position it would normally be held in, in use, excepting that the shank has been broken away in order to keep the scale of the illustration large enough to effectively illustrate the structure.

Fig. 2 is a side elevational view of my disc cultivator with certain parts broken away in order to better illustrate the construction, the sectioning corresponding to the cutting line 2—2 of Fig. 1.

Fig. 3 is a vertical sectional view taken along the axis of rotation of a disc and shaft assembly of which I use two in my device.

Fig. 4 is a fragmentary perspective view showing a form of adjusting means that has proved satisfactory to overcome many of the difficulties encountered in this type of equipment.

Referring more particularly to the disclosure in the drawings, the numeral 10 designates the main shank or tubular frame member of my device. This shank at its upper end is provided with handles as 12 and 14, which are positioned at right angles to shank 10 and parallel to the general axis of rotation of my disc.

Fixedly secured to shank 10, is a yoke frame assembly 16. This is provided with oppositely extending frame portions, as 18 and 20, which which terminate in forwardly extending legs 22 and 24. These legs at their forward extremities provide mounting openings as at 26 for the outer ends of the disc supporting shafts 28 and 30, respectively. The inner ends of shafts 28 and 30 are supported by a yoke member 32 which has two forwardly extending leg portions 34 and 36.

Yoke 32 is mounted for horizontal reciprocation within sleeve 38, which sleeve in turn is fixedly secured to frame 16 and so positioned angularly with shank 10 that it will lie in the horizontal plane when shank 10 is in the raised position of use. Fork 32 is provided on its upper surface with a modified rack gear 40, which is adapted for reciprocation within the open groove 42 formed in the upper surface of sleeve 38. This action provides a means for holding yoke 32 against rotation so that it will at all times provide a proper seat for the inner end of shafts 28 and 30. This construction is shown in Fig. 1.

Adapted to operatively engage rack 40 is a spiral gear 44. Gear 44 is fixedly secured to its operating shaft 46. Shaft 46 in turn is journaled within shank 10, as at 48 and 50. At the upper end of shaft 46, and exterior to the handle of the implement is a small hand crank 52. This crank is in a convenient position for use by either the right or left hand, depending upon which hand is holding the handle proper and is guiding the cultivator.

Each of the disc supporting shafts 28 and 30 has mounted upon it, and disposed for revolution thereon, a sleeve 56, to which is secured a plurality of discs 58, or in certain cases the sleeve may be divided to provide individual disc units. In my drawings I have illustrated two such discs on each shaft. It will be apparent, it is believed, that a greater number might be employed, particularly if they were of a smaller diameter. From a study of Figs. 1 and 3 it is believed it will be apparent that the sleeve 56 and the discs mounted thereon may be used as shown in Fig. 1 and, during use, when so mounted, would throw dirt outwardly from the center line of movement, or they might be reversed on shafts 28 and 30, and would then pitch the dirt inwardly to the center, as might be desired for certain ground preparation, for row crops, for instance.

Disc 58 should conform to the normal design of cultivating discs. Such discs would normally be sharpened around their peripheries so as to provide a neat cutting edge and the amount of dishing or curvature should conform to best practice for the types of soil encountered.

Method of use

In using my cultivator, it is normally stored after use with the disc supporting shafts in alignment, after the showing of Fig. 1. This is the most convenient way in which to roll the cultivator along the ground with the least effort, as would normally be used in moving the same from place to place, and may be so used for certain types of work. However, as in large plows and disc cultivators used for horse or tractor drawing, it has been found desirable to be able to change the pitch of the discs, and the farmer has found it most convenient and practical to change the angular relationship between the two opposing disc assemblies. I have shown a changed position of the disc assemblies by dashed lines in Fig. 1, this representing about the extreme of the adjustment of which the mechanism of that figure is capable.

It has been found very important in a manually operated implement of this order, that the adjustment of the shafts 28 and 30 be such that the various discs will at all times have their bottom cutting edges on the same horizontal plane. It therefore follows that the displacement of the inner ends of shafts 28 and 30 must be made in a horizontal plane, if this desirable relationship is going to be retained. With the structure shown, it is believed it will be apparent that the angular displacement of shafts 28 and 30 is always conveniently under the control of the operator, who needs only to turn crank 52 until the degree of adjustment has been achieved, and then because of the nature of spiral gear 44 and of rack 40, these elements provide a locking means without further attention on the part of the operator and they do not have to be unlocked as to do so many of the devices observed in order to effect a new change of pitch. This feature is believed to be quite essential in an implement of this order if it is going to be of real value to the hand farmer.

It is believed that it will be clearly apparent from the above description and the disclosure in the drawings that the invention comprehends a novel construction of an adjustable disc garden cultivator.

Having thus described my invention, I claim:

1. An adjustable disc garden cultivator, consisting of: a horizontally disposed yoke frame; a tubular frame member secured to said frame at an acute angle; a horizontally disposed sleeve secured to said frame; a fork member adapted for reciprocation within said sleeve; a rack disposed on said fork; a pinion operatively engaging said rack; a shaft supported by said tubular frame member and adapted to revolve said pinion; a crank for revolving said shaft positioned adjacent the upper end of said tubular frame member; two disc supporting shafts each of which is supported at its outer end by said yoke frame and supported at its inner end by said fork member; a plurality of disc cutters disposed for rotation on said shafts; and a handle secured to the upper end of said tubular frame member.

2. An adjustable disc garden cultivator, comprising: a horizontally disposed yoke frame member; a second frame member secured to said yoke frame member at an acute angle; a horizontally disposed guide member secured to said yoke frame member; a movable member adapted for reciprocation along said guide member; two disc supporting shafts, each of which is supported at its outer end by said yoke frame member and supported at its inner end by said movable member; a plurality of disc cutters disposed for rotation on said shafts; an operating member positioned adjacent the upper end of said second frame member; a connecting shaft running from said operating member to adjacent said movable member; and means on said movable member and said connecting shaft for moving said movable member along said guide member upon operation of said operating member.

3. An adjustable disc garden cultivator, comprising: a horizontally disposed yoke frame member; a second frame member secured to said yoke member at an acute angle; a horizontally disposed guide member secured to said yoke frame member; a movable member adapted for reciprocation along said guide member; two disc supporting shafts, each of which is supported at its outer end by said yoke frame member and supported at its inner end by said movable member; a plurality of disc cutters disposed for rotation on said shafts; a rack formed on said movable member; a pinion operatively engaging said rack; and an operating member positioned on said second frame member and connected to said pinion for rotating the same.

4. An adjustable disc garden cultivator, comprising: a horizontally disposed yoke frame member; a second frame member secured to said yoke member at an acute angle; a handle secured to the upper end of said second frame member; a horizontally disposed guide member secured to said yoke frame member; a movable member adapted for reciprocation along said guide member; two disc supporting shafts each of which is supported at its outer end by said yoke frame member and supported at its inner end by said movable member; a plurality of disc cutters disposed for rotation on said shafts; an operating member disposed adjacent said handle; said movable member having a rack formed thereon; an operating gear engaged with said rack; and a shaft connecting said operating gear and said operating member, whereby rotation of said operating member will revolve said operating gear.

MARION S. HOENSHELL.

REFERENCES CITED

The following references are of record in the file of this patent:

UNITED STATES PATENTS

| Number | Name | Date |
| --- | --- | --- |
| 1,112,046 | Zentz | Sept. 29, 1914 |
| 1,201,649 | Taylor | Oct. 17, 1916 |